United States Patent
Lin (10) Patent No.: US 11,311,924 B2
(45) Date of Patent: Apr. 26, 2022

(54) AUTOMATIC PRODUCTION EQUIPMENT FOR SHEET METAL STAMPING AND IN-MOLD RIVETING THEREON

(71) Applicant: Quanta Computer Inc., Taoyuan (TW)

(72) Inventor: Shu-Chen Lin, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 51 days.

(21) Appl. No.: 16/950,110

(22) Filed: Nov. 17, 2020

(65) Prior Publication Data

US 2022/0001433 A1 Jan. 6, 2022

(30) Foreign Application Priority Data

Jul. 3, 2020 (TW) ................................. 109122663

(51) Int. Cl.
| | |
|---|---|
| *B21D 22/02* | (2006.01) |
| *B21J 15/10* | (2006.01) |
| *B21D 43/02* | (2006.01) |
| *B21D 28/26* | (2006.01) |

(52) U.S. Cl.
CPC ............. *B21D 22/02* (2013.01); *B21D 28/26* (2013.01); *B21D 43/02* (2013.01); *B21J 15/10* (2013.01)

(58) Field of Classification Search
CPC ............ B21D 22/02; B21J 15/10; B21J 15/32
See application file for complete search history.

(56) References Cited

U.S. PATENT DOCUMENTS

| | | | | |
|---|---|---|---|---|
| 2,172,446 A | * | 9/1939 | Marsack ................ | B68G 7/08 221/124 |
| 2,328,821 A | * | 9/1943 | Lyon .................... | B21J 15/46 227/114 |
| 3,948,427 A | * | 4/1976 | Claydon ............... | B21J 15/025 29/524.1 |
| 5,036,569 A | * | 8/1991 | Linnecke ............. | B65G 47/1421 29/33 K |
| 5,218,756 A | * | 6/1993 | Zaleski ................. | B21J 15/10 29/818 |

\* cited by examiner

*Primary Examiner* — David P Bryant
*Assistant Examiner* — Amanda Kreiling (57) ABSTRACT

An automatic production equipment includes a strip-material feeding device set, a continual stamping die set and a rivet providing mechanism. The strip-material feeding device set feeds a strip material. The continual stamping die set includes a upper stamping die group and a lower stamping die group. The lower stamping die group includes a lower die plate, a strip receiving groove formed on the lower die plate for receiving the strip material, a sliding block slidable on the strip receiving groove, and a guide groove formed on the sliding block to connect to the strip receiving groove. The upper stamping die group includes an upper clamping plate, a pushing lever and a riveting punch. The pushing lever and the riveting punch are located on the upper clamping plate. The rivet providing mechanism is connected to the sliding block, and feeds rivets into the guide groove in order.

10 Claims, 10 Drawing Sheets

AUTOMATIC PRODUCTION EQUIPMENT FOR SHEET METAL STAMPING AND IN-MOLD RIVETING THEREON

CROSS-REFERENCE TO RELATED APPLICATION

This application claims priority to Taiwan Application Serial Number 109122663, filed on Jul. 3, 2020, which is herein incorporated by reference.

BACKGROUND

Technical Field

The present disclosure relates to an automatic production equipment. More particularly, the present disclosure relates to an automatic production equipment for sheet metal stamping and in-mold riveting thereon.

Description of Related Art

As labor costs increase, enterprises have introduced automatic production equipment in the production process to replace labor-intensive manual operations. The economic benefits brought by the automatic production equipment have become one of the keys to creating corporate value and enhancing industrial competitiveness. For example, the automatic production equipment is used in the production line to integrate the stamping process and assembly, and for cumbersome processing procedures, efficient control and management through process integration.

For procedural processing, since the operation of each process stage will directly affect the results of the output, if it is all dependent on manual management of each process stage, the replacement of the waiting period of the production line and the inventory in transit will often reduce the operation. More efficiently, high cost and extended delivery time, so the integration of different processing procedures can be said to be the key to the success or failure of smooth automated production.

For example, after the sheet-shaped coil is fed from the feed end of the mold, the semi-finished product of the desired shape is completed through the stamping station, and the subsequent processing must be transferred to other station equipment for subsequent processing. In terms of a single task station, only one processing task can be processed. As the number of processing tasks increases, the number of production lines required increases. However, frequent replacement of production lines causes problems such as high costs, lengthy processing procedures, and inability to improve production efficiency.

SUMMARY

One aspect of the present disclosure is to provide an automatic production equipment for sheet metal stamping and in-mold riveting thereon to solve the aforementioned problems of the prior art.

In one embodiment of the disclosure, an automatic production equipment for sheet metal stamping and in-mold riveting thereon includes a strip-material feeding device set, a continual stamping die set and a rivet providing mechanism. The strip-material feeding device set is used to continually moving a sheet-metal strip material along a material-feeding direction, wherein the sheet-metal strip material is forwardly moved one distance unit per time interval to one of predetermined locations. The continual stamping die set includes a lower stamping die group and a upper stamping die group. The lower stamping die group includes a lower die plate, a strip receiving groove, a sliding block and a guide groove. The strip receiving groove is formed on the lower die plate for receiving the sheet-metal strip material. The sliding block is slidably located on the strip receiving groove, and the guide groove is formed on one lateral side of the sliding block to connect to the strip receiving groove in a stamping stroke direction. The upper stamping die group includes an upper clamping plate, a pushing lever and a riveting punch. The pushing lever and the riveting punch are respectively located on the upper clamping plate to extend towards the stamping stroke direction. The material-feeding direction is orthogonal to the stamping stroke direction. The rivet providing mechanism is connected to the sliding block, and is used to feed rivets into the guide groove one by one. When the upper stamping die group moves to the lower stamping die group along the stamping stroke direction, the strip-material feeding device set stops pushing the sheet-metal strip material, and the upper stamping die group pushes the sliding block in the material-feeding direction, so that one of the rivets in the guide groove coaxially aligns with the pushing lever, the pushing lever pushes the one of the rivets from the guide groove to the sheet-metal strip material for allowing the riveting punch to subsequently punch the one of the rivets onto the sheet-metal strip material.

According to one or more embodiments of the disclosure, in the foregoing automatic production equipment, the rivet providing mechanism includes a hopper, a rivet conveying rail and a vibrating machine. The hopper stores the rivets therein. The rivet conveying rail is connected to the hopper and the sliding block respectively. The vibrating machine is connected to the hopper and the rivet conveying rail for outputting the vibration energy that is capable of sending the rivets to the guide groove one by one through the rivet conveying rail.

According to one or more embodiments of the disclosure, in the foregoing automatic production equipment, the vibrating machine includes a circular type vibration module and a circular type vibration module. The circular type vibration module is physically contacted with a bottom of the hopper for outputting a vertical vibration energy to the hopper. The linear type vibration module is physically contacted with the rivet conveying rail for outputting a horizontal vibration energy to the rivet conveying rail.

According to one or more embodiments of the disclosure, in the foregoing automatic production equipment, the strip-material feeding device set includes a strip-material roll holder and two strip-feeding rollers. The strip-material roll holder is bundled around by one part of the sheet-metal strip material. The strip-feeding rollers are located between the strip-material roll holder and the continual stamping die set for clamping the sheet-metal strip material therebetween. Thus, the strip-feeding rollers are rotated reversely with each other to continually forwardly push the sheet-metal strip material, and the strip-feeding rollers equidistantly moves the sheet-metal strip material the distance unit forwardly per time interval.

According to one or more embodiments of the disclosure, in the foregoing automatic production equipment, the lower stamping die group includes a stop block, a block-side baffle, an elastic element and a horizontal axis column. The block-side baffle is located on the lower die plate, and between the stop block and the sliding block. A gap is formed between the block-side baffle and the sliding block.

The sliding block is provided with a guide slope facing towards the gap. The elastic element abuts against the stop block and the block-side baffle. The horizontal axis column penetrates through the block-side baffle. Two opposite ends of the horizontal axis column are fixedly connected to the sliding block and the stop block. The upper stamping die group further includes a pushing block disposed on the upper clamping plate. The pushing lever is disposed between the pushing block and the riveting punch. Thus, when the pushing block extends into the gap, the pushing block pushes the sliding block along the guide slope to slide in the material-feeding direction of the sheet-metal strip material, so that the elastic element is compressed by the stop block and the block-side baffle, and the lateral side of the sliding block abuts against one of the rivets on the rivet providing mechanism.

According to one or more embodiments of the disclosure, in the foregoing automatic production equipment, the upper stamping die group further includes a pressing plate, a crank shaft, a crank element, a crank guide block and a spring element. The pressing plate is fixedly connected to the upper clamping plate. The crank element is pivotally connected to the pressing plate through the crank shaft. One part of the crank element abuts against the pushing lever, and a long axis direction of the crank element intersects the stamping stroke direction. The crank guide block is movably located on the upper clamping plate, and abuts another part of the crank element. The spring element connected to the crank guide block and the pressing plate. When the upper stamping die group moves the pressing plate downwardly, so that the pressing plate pushes the crank guide block through the spring element, the crank guide block and the pressing plate compress the spring element to store a restoring resilience force. When the guide groove is coaxially aligned with the pushing lever, the restoring resilience force of the spring element rises the crank guide block to rise, so that the crank guide block rotates the crank element by a swing angle, and presses down the pushing lever by the one part of the crank element such that the one of the rivets is sent onto the sheet-metal strip material.

According to one or more embodiments of the disclosure, in the foregoing automatic production equipment, the upper stamping die group further includes a plurality of cutting dies. The cutting dies are located on the lower die plate, and arranged in order in the material-feeding direction for respectively punching on different positions of the sheet-metal strip material to complete a plurality of workpieces in sequence.

According to one or more embodiments of the disclosure, in the foregoing automatic production equipment, each of the workpieces is designed to be sequentially formed on the sheet-metal strip material by a variety of stamping processes, and the cutting dies are allowed to simultaneously perform the stamping processes on the sheet-metal strip material.

According to one or more embodiments of the disclosure, the foregoing automatic production equipment further includes a patching device. The patching device is connected to the continual stamping die set for attaching an insulating sheet to each of the workpieces.

According to one or more embodiments of the disclosure, the foregoing automatic production equipment further includes a transporting device. The transporting device is used to load one of the workpieces having the insulating sheet into a box.

Thus, based on the embodiments above, the present disclosure can not only reduce the cost of production line configuration, but also can improve the efficiency of the working process and the production efficiency.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The accompanying drawings are included to provide a further understanding of the present disclosure, and are incorporated in and constitute a part of this specification. The drawings illustrate embodiments of the disclosure and, together with the description, serve to explain the principles of the disclosure. In the drawings.

DETAILED DESCRIPTION

Reference will now be made in detail to the present embodiments of the present disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 1:
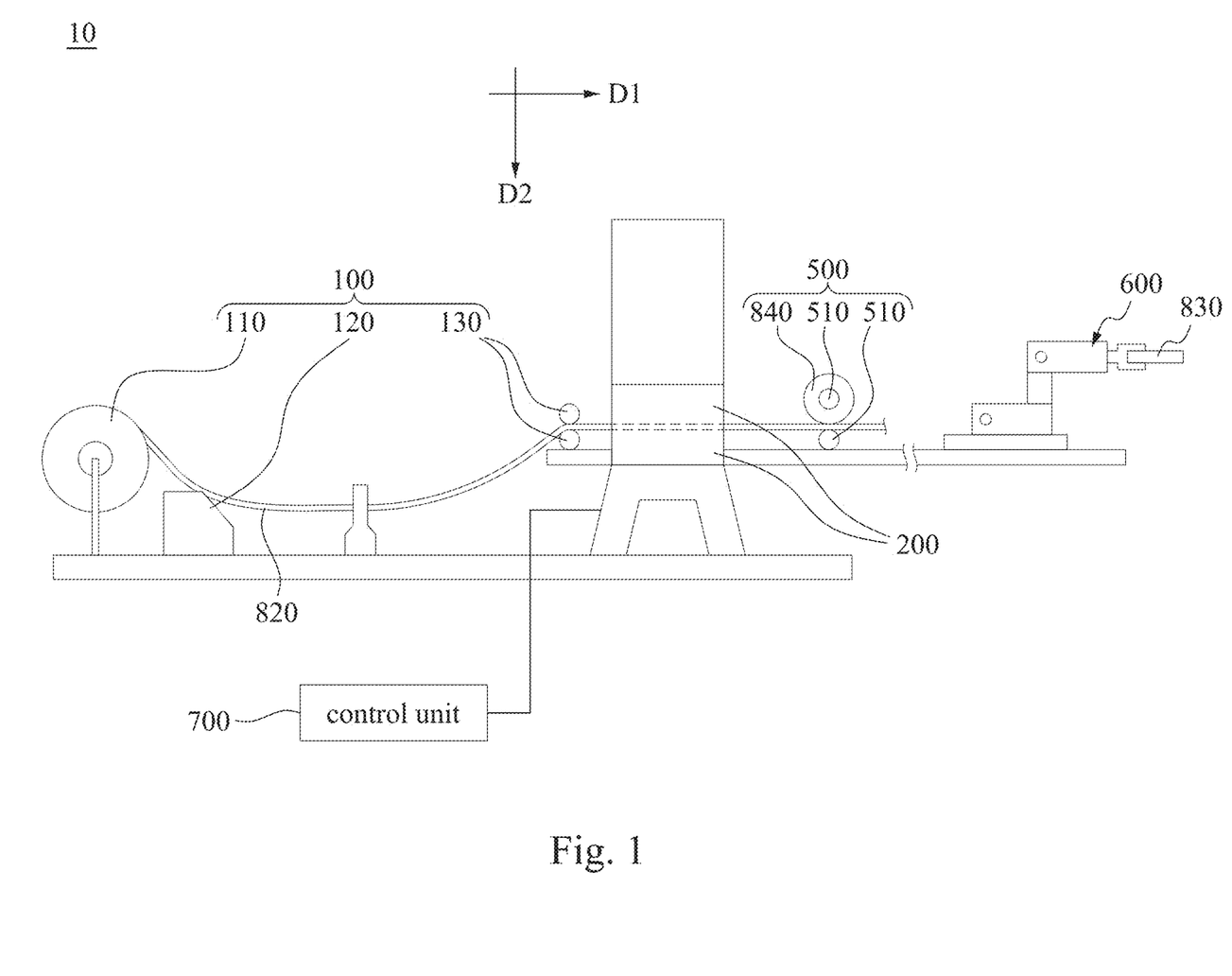
FIG. 1 is a schematic diagram of an automatic production equipment for sheet metal stamping and in-mold riveting thereon according to one embodiment of present disclosure.
Figure 2:
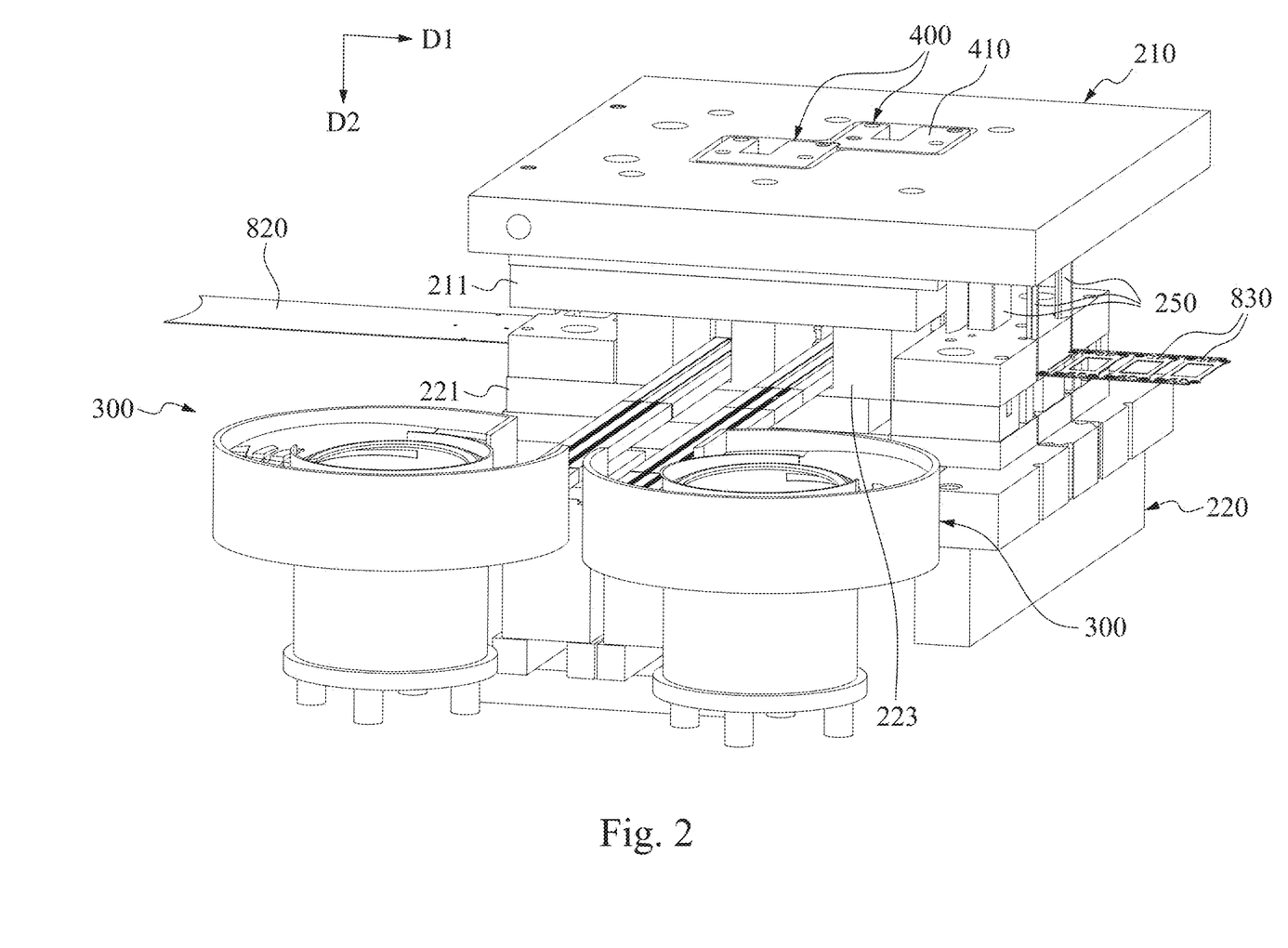
FIG. 2 is a perspective view of a continual stamping die set and a rivet providing mechanism of the automatic production equipment according to one embodiment of present disclosure.
Figure 3:
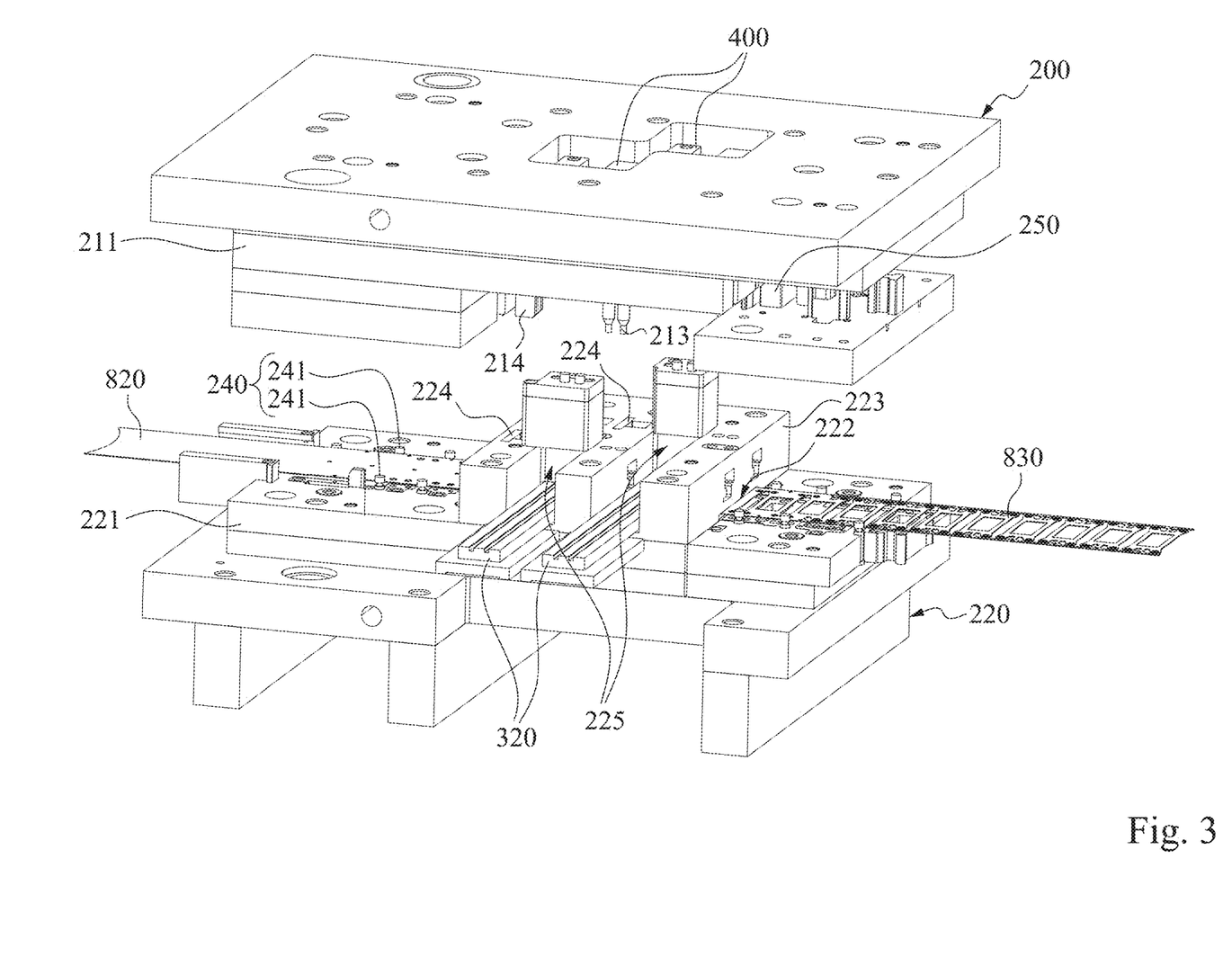
FIG. 3 is an exploded view of the continual stamping die set in FIG. 2.

Reference is now made to FIG. 1 to FIG. 3 in which FIG. 1 is a schematic diagram of an automatic production equipment 10 for sheet metal stamping and in-mold riveting thereon according to one embodiment of present disclosure, FIG. 2 is a perspective view of a continual stamping die set 200 and a rivet providing mechanism 300 of the automatic production equipment 10 according to one embodiment of present disclosure, and FIG. 3 is an exploded view of the continual stamping die set 200 in FIG. 2. As shown in FIG. 1 to FIG. 3, in one embodiment, the automatic production equipment 10 includes a strip-material feeding device set 100, a continual stamping die set 200 and two rivet providing mechanisms 300. The strip-material feeding device set 100 continually pushes a strip material 820 (e.g., sheet-metal strip material) along a material-feeding direction D1, and the strip material 820 is forwardly moved one distance unit per time interval to one of predetermined locations. The continual stamping die set 200 includes a upper stamping die group 210 and a lower stamping die group 220 which are able to be closed to each other, that is, the upper stamping die group 210 and the lower stamping die group 220 are driven to repeatedly perform mold closing and opening tasks by a stamping machine. The lower stamping die group 220 includes a lower die plate 221, a strip receiving groove 222, and a convex die plate 223 having two sliding blocks 230 (FIG. 5A) fixed thereon. The strip receiving groove 222 is formed on the lower die plate 221 for receiving the strip material 820. One lateral side of each of the sliding blocks 230 is formed with at least one guide groove 231. The guide groove 231 is connected to the strip receiving groove 222 below in a stamping stroke direction D2 that is orthogonal to the material-feeding direction D1. The upper stamping die group 210 includes an upper clamping plate 211, two pushing levers 212 (FIG. 7A), two riveting punches 213 and two pushing blocks 214. The pushing levers 212 (FIG. 7A), the riveting punches 213 and the pushing blocks 214 are respectively located on the upper clamping plate 211 to extend towards the stamping stroke direction D2. The rivet providing mechanism 300 is respectively connected to the sliding blocks 230 so as to feed rivets 810 into each of the guide grooves 231 one by one. when the upper stamping die group 210 is going to move to the lower stamping die group 220 along the stamping stroke direction D2 for closing to the lower stamping die group 220, the strip-material feeding device set 100 stops pushing the strip material 820, and each of the pushing blocks 214 fixed on the upper stamping die group 210 pushes one of the sliding blocks 230 to move so that one of the rivets 810 in the guide groove 231 coaxially aligns with the pushing lever 212 exactly, the pushing lever 212 pushes the rivet 810 from the guide groove 231 to the strip material 820. On the contrary, whenever the stamping machine rises the upper stamping die group 210 upwardly to a predetermined position, the pushing blocks 214 are upwardly brought to the predetermined position by the upper stamping die group 210 so that the sliding blocks 230 respectively move back to the original position. The pushing levers 212 (FIG. 7A) are respectively risen away from the guide groove 231, the riveting punches 213 are moved away from the strip material 820, and the strip-material feeding device set 100 resumes to pushes the strip material 820 continually.

More specifically, the strip-material feeding device set 100 includes a strip-material roll holder 110, a leveling machine 120 and two strip-feeding rollers 130. The leveling machine 120 is disposed between the strip-material roll holder 110 and the strip-feeding rollers 130. One part of the strip material 820 is bundled on the strip-material roll holder 110, and another part of the strip material 820 is sent into the continual stamping die set 200. The strip-feeding rollers 130 are located between the strip-material roll holder 110 and the continual stamping die set 200 for clamping the strip material 820 between the strip-feeding rollers 130, and continually moving the strip material 820 forwardly in the material-feeding direction D1.

In the embodiment, the strip-feeding rollers 130 are driven by a powering device (not shown in figures), so that the strip-feeding rollers 130 are rotated reversely with each other to continually forwardly push the strip material 820 in the material-feeding direction D1, and the strip-feeding rollers 130 equidistantly moves the strip material 820 by the distance unit forwardly per time interval (e.g., 0.5-0.7 sec.), however, the disclosure is not limited thereto.

In addition, the lower stamping die group 220 further includes a plurality of floating guide pin groups 240. The floating guide pin groups 240 are sequentially arranged on the lower die plate 221. Each of the floating guide pin groups 240 includes two guide pins 241. The two guide pins 241 of each of the floating guide pin groups 240 is contacted with two opposite sides of the strip material 820, so that the strip material 820 can be guided to steadily advance in the material-feeding direction D1 between the guide pins 241. The convex die plate 223 is disposed on the lower die plate 221 for the pushing blocks 214 and the riveting punches 213 to enter the convex die plate 223 through the corresponding through holes 224 respectively so as to push the sliding block 230 to slide in the convex die plate 223.

Also, the upper stamping die group 210 further includes a plurality of cutting dies 250 located on the lower die plate 221, and arranged in order in the material-feeding direction D1 for respectively punching on different positions of the strip material 820 to complete a plurality of workpieces 830 in sequence. Each of the workpieces 830 is designed to be sequentially formed on the strip material 820 by a variety of stamping processes. Thus, the cutting dies 250 are allowed to simultaneously perform the stamping processes on the strip material 820. For example, each of the above-mentioned workpiece 830 is a processor (e.g., CPU) bracket, and the processor bracket is sequentially completed by multiple punching processes including punching, contour punching, and bracket separation.

Since the continual stamping die set 200 uses dry lubrication protective agents and wash-free lubricants for die lubrication, the aforementioned workpieces 830 will not be contaminated by the lubricant of the mold machinery and equipment during the stamping process, so that the aforementioned workpieces 830 will not be needed to be removed away from the production line for cleaning, degreasing and drying the aforementioned workpieces 830.

Figure 4:
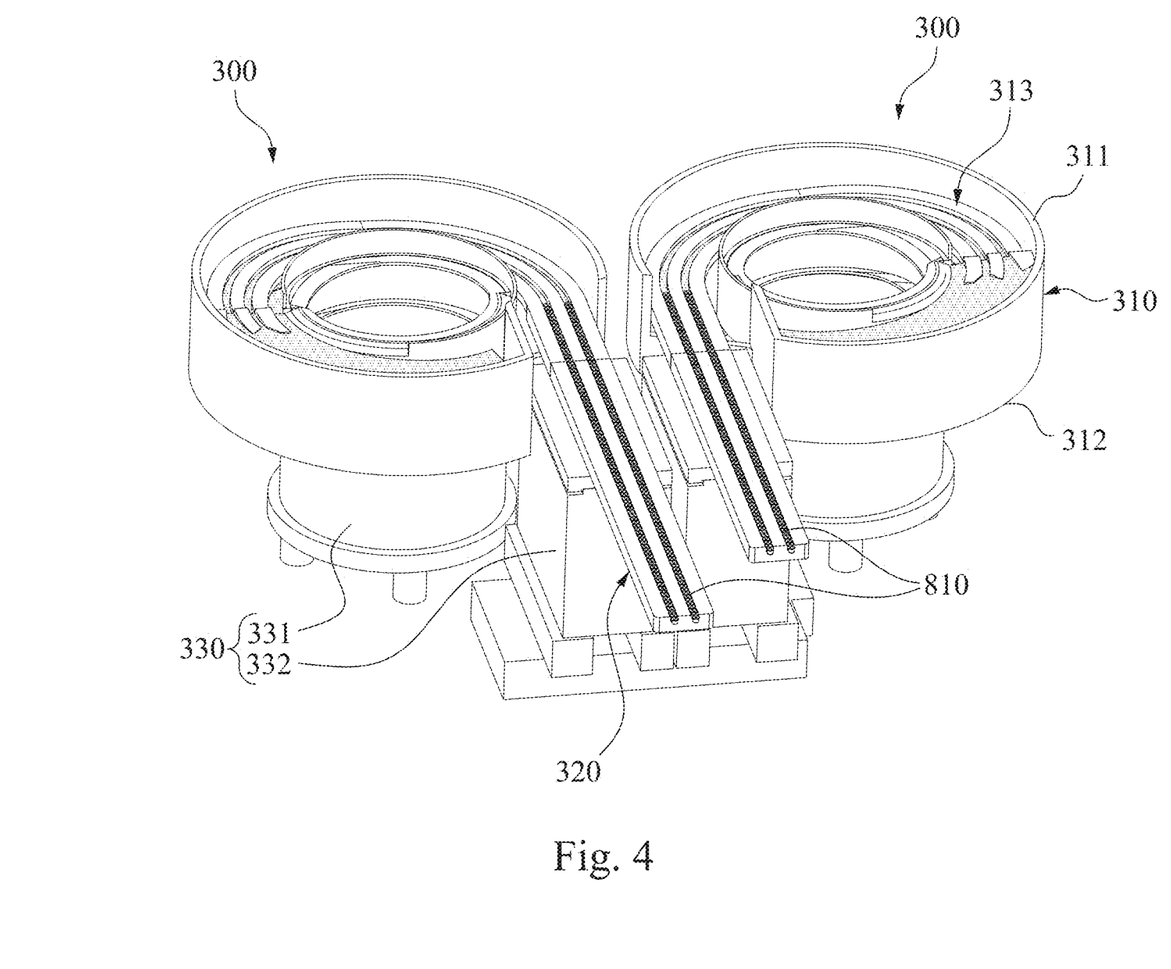
FIG. 4 is a perspective view of the rivet providing mechanism viewed by another viewing angle in FIG. 2.

More specifically, please refer to FIG. 3 and FIG. 4 together, the rivet providing mechanism 300 includes a hopper 310, a rivet conveying rail 320 and a vibrating machine 330. The hopper 310 stores the rivets 810 therein. One end of the rivet conveying rail 320 is connected to the hopper 310, and another end of the rivet conveying rail 320 extends into a recess 225 of the convex die plate 223 to connect to each of the sliding blocks 230 through the convex die plate 223. The rivet providing mechanism 300 is connected to the hopper 310 and the rivet conveying rail 320 for outputting the vibration energy that is capable of sending the rivets 810 to the guide groove 231 one by one through the rivet conveying rail 320. It is noted that since the rivets 810 are continuously arranged in the rivet conveying rail 320 without intervals in a single row, the rivets 810 can be sequentially pushed into the guide groove 231 one by one.

For example, the hopper 310 is provided with a spiral track 313 inside. The spiral track 313 is spirally arranged inside the hopper 310, and one end of the spiral track 313 is located at the bottom portion 312 of the hopper 310, and the other end of the spiral track 313 rises to the top portion 311 of the hopper 310, and is connected to the rivet conveying rail 320. The vibrating machine 330 includes a circular type vibration module 331 and a linear type vibration module 332. The circular type vibration module 331 is physically contacted with a bottom portion 312 of the hopper 310 for outputting a vertical vibration energy to the hopper 310. The linear type vibration module 332 is physically contacted with the rivet conveying rail 320 for outputting a horizontal vibration energy to the rivet conveying rail 320. Through the vertical vibration energy, the rivets 810 can be guided and transported to the rivet conveying rail 320.

Because the rivets 810 stored in the hopper 310 are vibrated to rise along the spiral track 313, after a series of corrective arrangements of the rivet conveying rails 320 during the ascending process, the rivets 810 automatically enter a linear track in a unified state according to the direction of assembly and riveting processing. The linear type vibration module 332 is physically contacted with the rivet conveying rail 320 for outputting a horizontal vibration energy to the rivet conveying rail 320. Through the action of vibration, the rivets 810 can be automatically arranged in an orderly and orderly manner, and the rivet conveying rail 320 can be accurately arranged. For example, the circular type vibration module 331 and the linear type vibration module 332 are pulse electromagnets respectively, however, the disclosure is not limited to thereto.

Figure 5A:
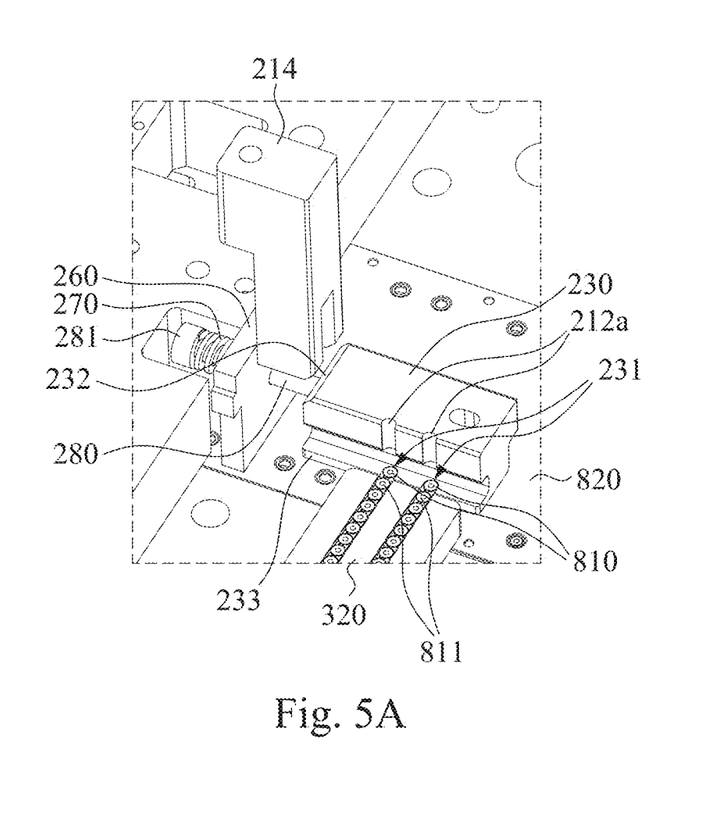
FIG. 5A and FIG. 5B are operation schematic views of the sliding block of the lower stamping die group being pushed by the pushing block of the upper stamping die group of FIG. 2.
Figure 5B:
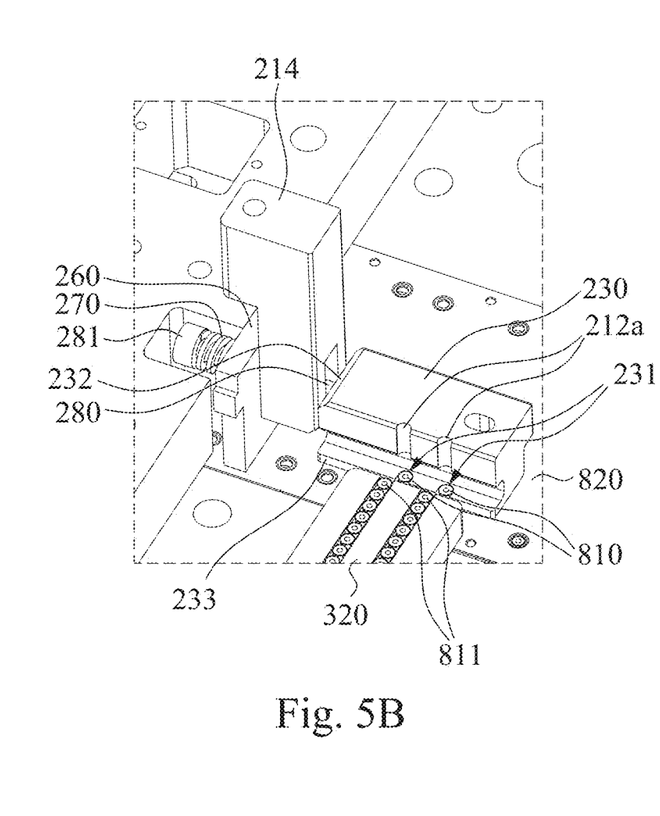
Figure 6A:
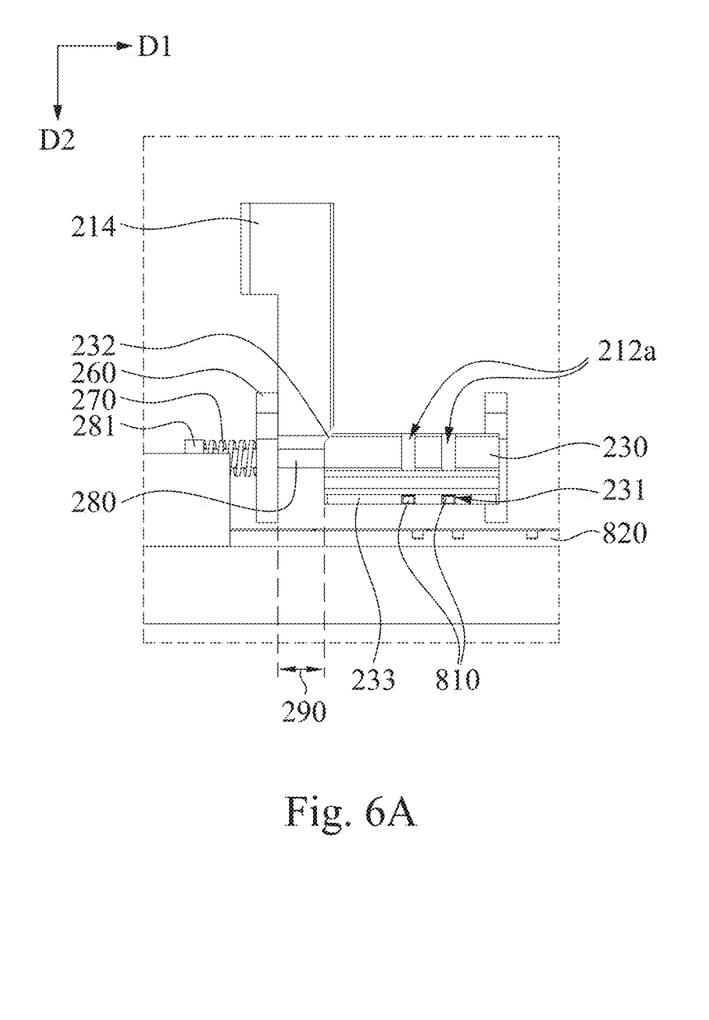
FIG. 6A is a front view of FIG. 5A.
Figure 6B:
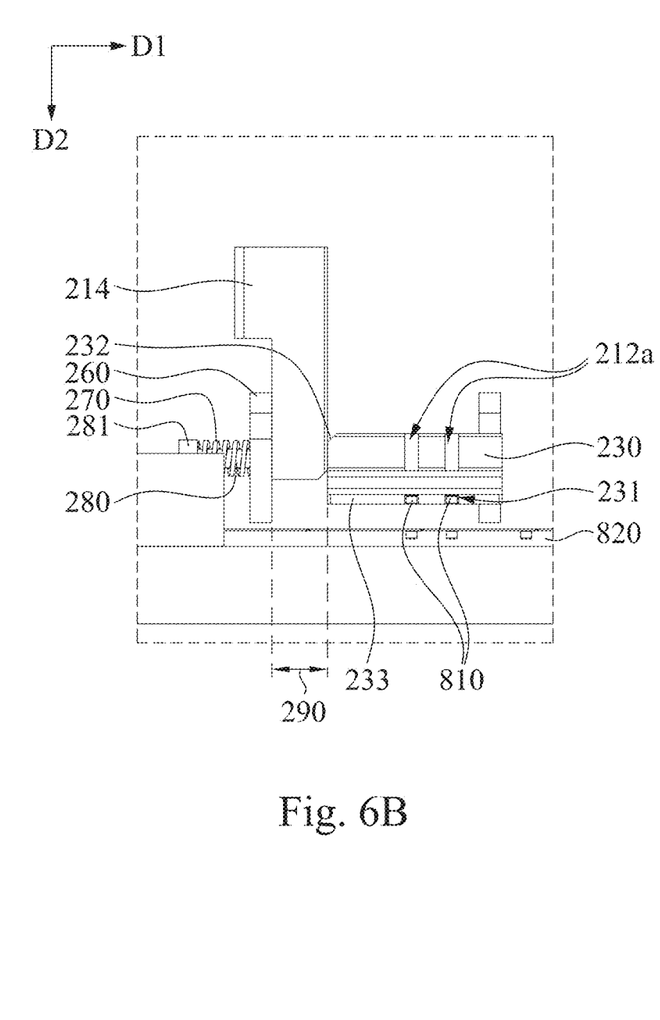
FIG. 6B is a front view of FIG. 5B.

Reference is now made to FIG. 5A to FIG. 6B in which FIG. 5A and FIG. 5B are operation schematic views of the sliding block 230 of the lower stamping die group 220 being pushed by the pushing block 214 of the upper stamping die group 220 of FIG. 2, FIG. 6A is a front view of FIG. 5A, and FIG. 6B is a front view of FIG. 5B. As shown in FIG. 3 and FIG. 5A, the pushing levers 212 are located between the pushing blocks 214 and the riveting punches 213. The lower stamping die group 220 includes a stop block 281, a block-side baffle 260, an elastic element 270 (e.g., stretched spring) and a horizontal axis column 280. The block-side baffle 260 is located on the lower die plate 221, and between the stop block 281 and the sliding block 230. A gap 290 is formed between the block-side baffle 260 and the sliding block 230. The sliding block 230 is provided with a guide slope 232 facing towards the gap 290. For example, a included angle of 45 degrees is formed between the slope of the guide slope 232 and the stamping stroke direction D2. The elastic element 270 is sleeved on the horizontal axis column 280, and two ends of the elastic element 270 abut against the stop block 281 and the block-side baffle 260, respectively. The horizontal axis column 280 penetrates through the block-side baffle 260. Two opposite ends of the horizontal axis column 280 are fixedly connected to the sliding block 230 and the stop block 281.

As shown in FIG. 5A and FIG. 6A, when the pushing block 214 extends downwards into the gap 290 along the guide slope 232, the pushing block 214 is able to push the sliding block 230 toward the forward direction D1 of the material through the guide slope 232, so that the rivet 810 in the guide groove 231 can slide laterally (FIG. 5B and FIG. 6B). At this moment, not only one of the rivets 810 in the guide groove 231 is allowed to be coaxially aligned with the corresponding pushing lever 212, but also the one of the rivets 810 in the corresponding guide groove 231 is allowed to be separated from the first one of the rivets 811 queued in the rivet conveying rail 320. Instead, the side surface 233 of the sliding block 230 abuts against the first one of the rivets 811 queued in the rivet conveying rail 320 so as to prevent the first one of the rivets 811 queued in the rivet conveying rail 320 from falling into the lower stamping die group 220 (FIG. 5B). At the same time, the stop block 281 and block-side baffle 260 begin to compress the elastic element 270 to store a restoring resilience force.

Conversely, when the continual stamping die set 200 is moved upwardly, so that the upper stamping die group 210 is upwardly moved away from the lower stamping die group 220 to move the pushing block 214 away from the gap 290, the restoring resilience force of the elastic element 270 starts to pull back the sliding block 230 and decrease the gap 290, and the guide groove 231 can be slidably aligned with the rivet conveying rail 320 laterally and aligned with the first one of the rivets 811 queued in the rivet conveying rail 320 to receive the first one of the rivets 811 queued in the rivet conveying rail 320. (FIG. 5A and FIG. 6A)

Figure 7A:
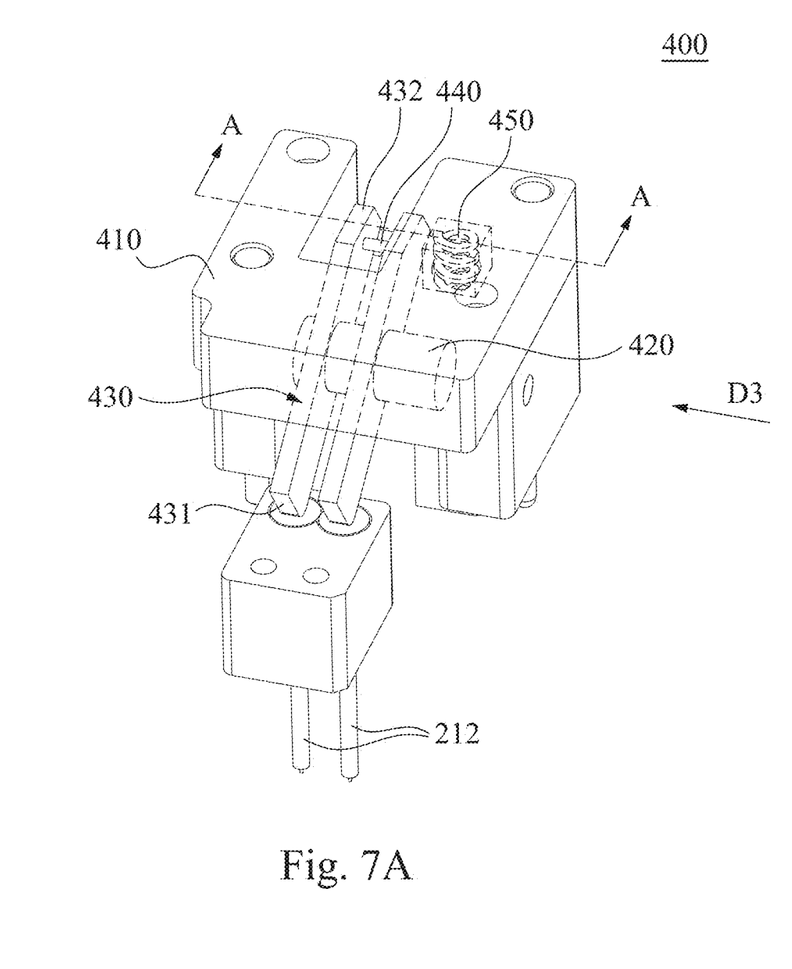
FIG. 7A is a perspective view of a pre-rivet feeding device of FIG. 2.
Figure 7B:
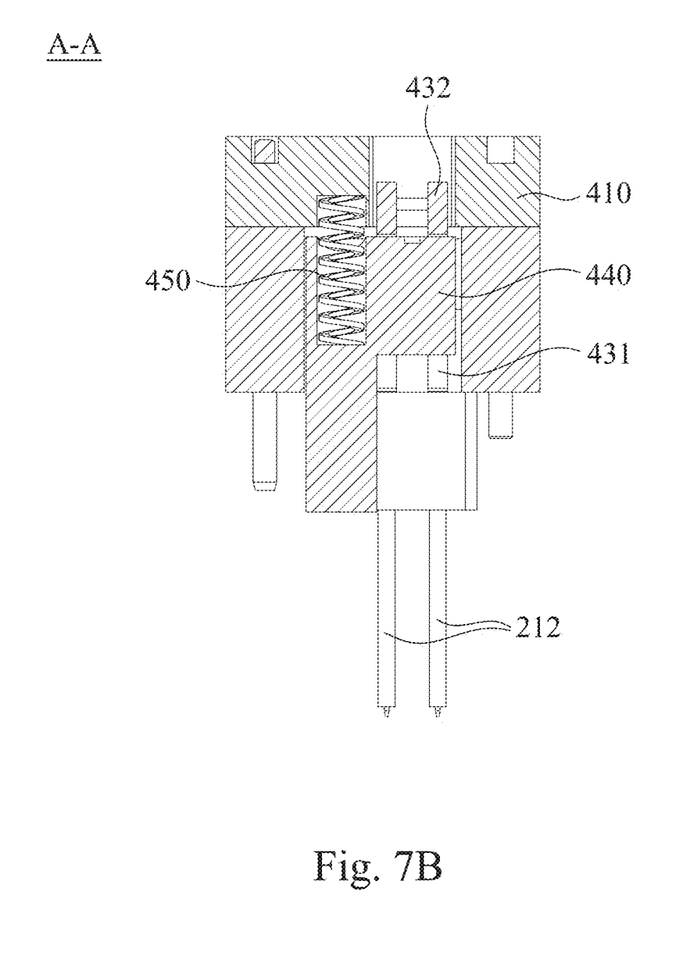
FIG. 7B is a partial cross-sectional view of FIG. 7A viewed along a line A-A.
Figure 8:
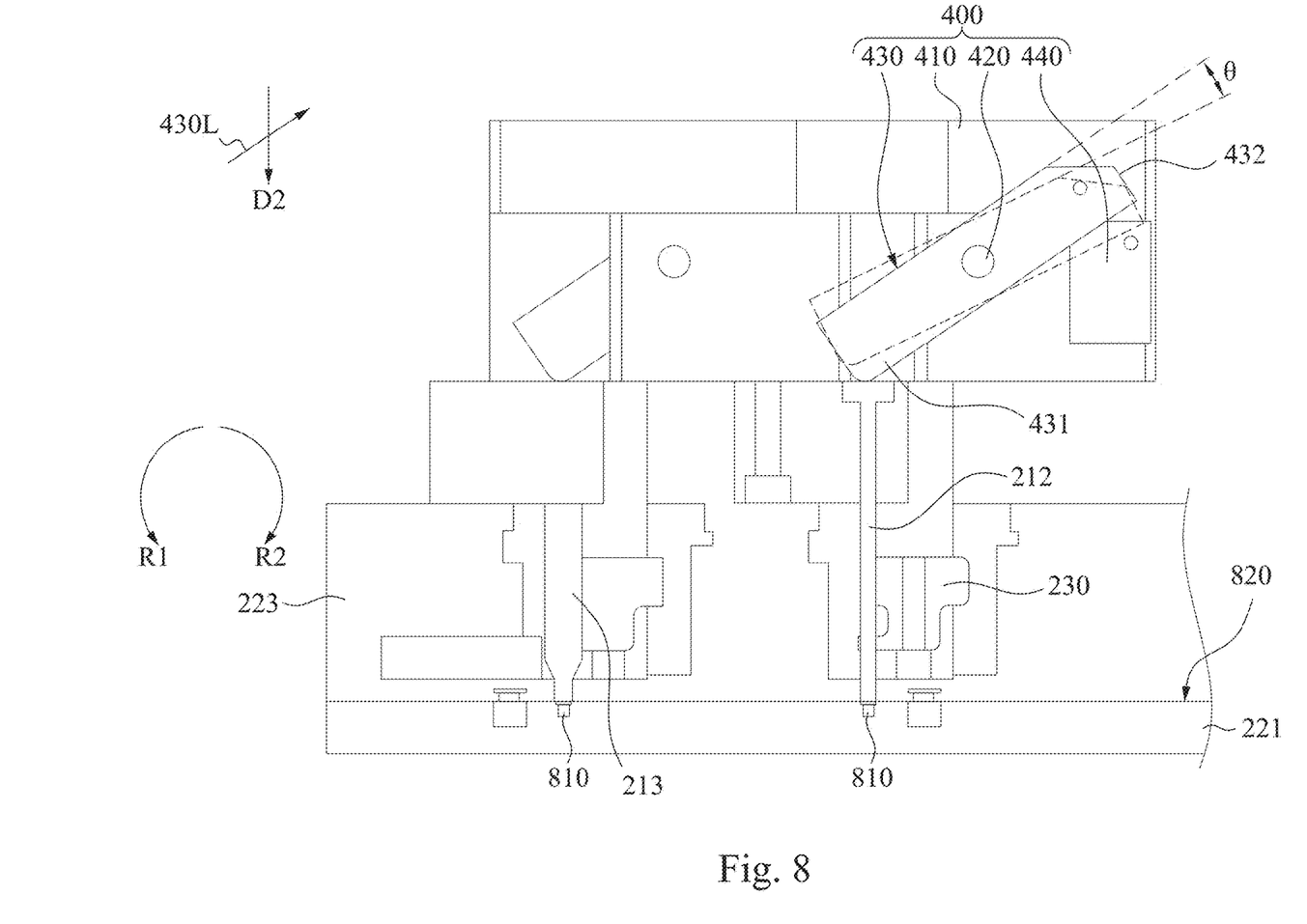
FIG. 8 is an operation cross-sectional view of the pre-rivet feeding device of FIG. 7A.

Reference is now made to FIG. 7A to FIG. 8 in which FIG. 7A is a perspective view of a pre-rivet feeding device 400 of FIG. 2, FIG. 7B is a partial cross-sectional view of FIG. 7A viewed along a line A-A, and FIG. 8 is an operation cross-sectional view of the pre-rivet feeding device 400 of FIG. 7A. As shown in FIG. 2 and FIG. 7A, the upper stamping die group 210 further incudes two pre-rivet feeding devices 400. Each of the pre-rivet feeding devices 400 includes a pressing plate 410, a crank shaft 420, a crank element 430, a crank guide block 440 and a spring element 450. The pressing plate 410 is fixedly connected to the upper stamping die group 210. The crank element 430 is pivotally connected to the pressing plate 410 through the crank shaft 420.

The crank element 430 includes a first part 431 and a second part 432. The first part 431 of the crank element 430 abuts against the pushing lever 212, and a long axis direction 430L of the crank element 430 intersects the stamping stroke direction D2. The crank guide block 440 is movably located on the upper clamping plate 211 of the upper stamping die group 210, and abuts the second part 432 of the crank element 430. The spring element 450 is connected to the crank guide block 440 and the pressing plate 410.

As shown in FIG. 7A and FIG. 8, as the pressing plate 410 moves the crank guide block 440 to reciprocate under the linking action of the continual stamping die set 200, the crank element 430 is pushed to swing about the crank shaft 420 as the rotation center, and the pushing lever 212 is pushed by the crank element 430 when the crank element 430 swings so as to push the rivet into a rivet hole on the strip material 820 for pre-riveting. Meanwhile, when the pressing plate 410 pushes the crank guide block 440 downwardly through the spring element 450, the crank guide block 440 and the pressing plate 410 collectively compress the spring element 450 to store a restoring resilience force. At the same time, the relative position of the guide groove 231 of the sliding block 230 slides laterally under the pushing lever 212, so that the rivet 810 in the guide groove 231 is aligned coaxially with the pushing lever 212. When the upper stamping die group 210 has not returned to its original position, the restoring resilience force of the spring element 450 starts to drive the crank guide block 440 rising, so that the crank guide block 440 rotates the crank element 430 in the first direction R1 by a swing angle θ, thereby causing the first part 431 of the crank element 430 to press down the pushing lever 212 and send the rivet 810 from the guide groove 231 onto the strip material 820 via the lever channel 212a of the sliding block 230, and also the rivet 810 falls into the rivet hole on the strip material 820. Conversely, when the upper stamping die group 210 is risen, so that the pressing plate 410 and the pushing lever 212 are returned to their original positions by inertia, the pushing lever 212 rotates the crank element 430 in the second direction R2 by the same swing angle θ.

Figure 9:
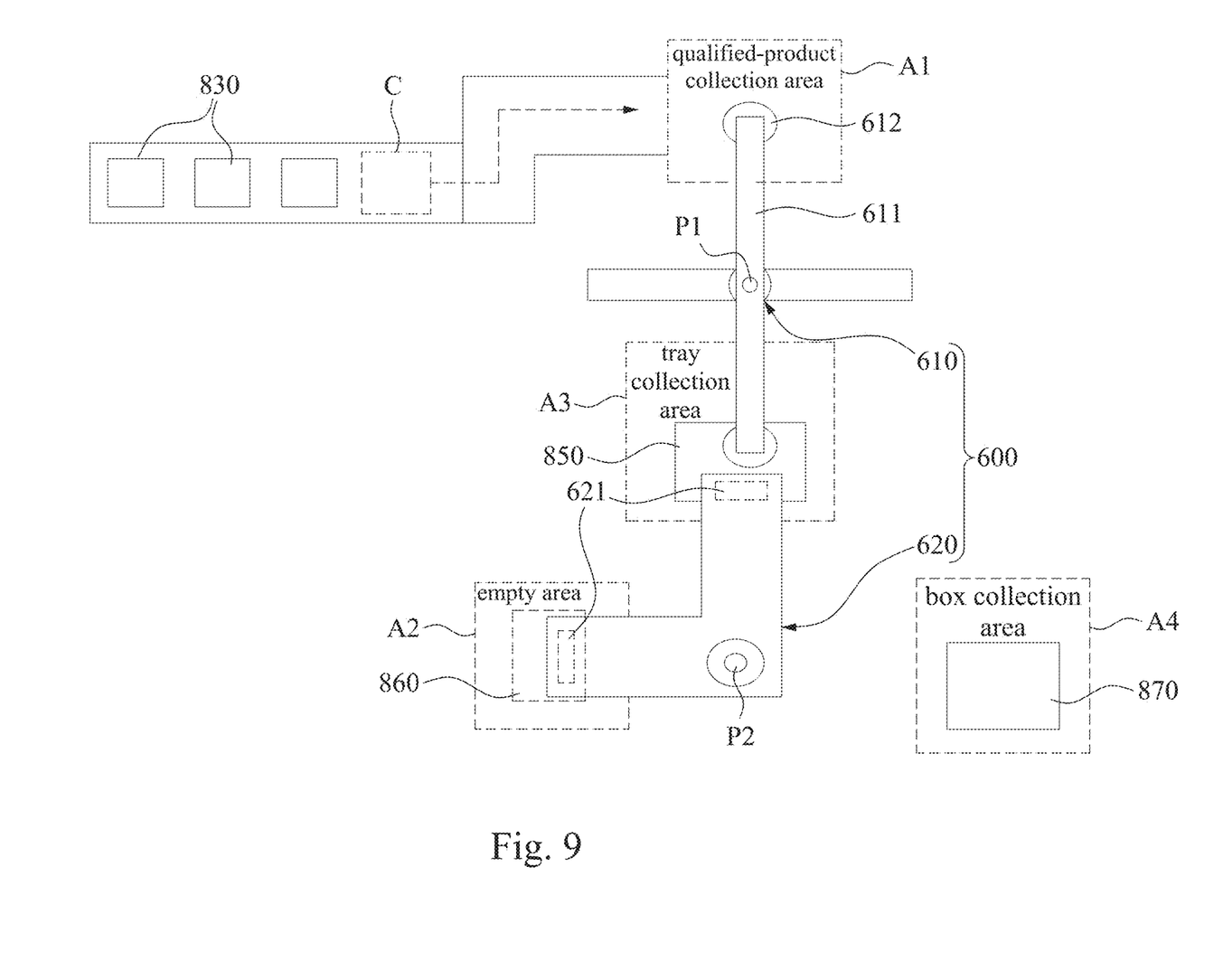
FIG. 9 is a schematic diagram of a transporting device of the automatic production equipment according to one embodiment of present disclosure.

FIG. 9 is a schematic diagram of a transporting device 600 of the automatic production equipment 10 according to one embodiment of present disclosure. As shown in FIG. 1 and FIG. 9, the automatic production equipment 10 further includes a patching device 500 and a transporting device 600. The patching device 500 is connected to the continual stamping die set 200, and located between the transporting device 600 and the continual stamping die set 200, and is used to attach an insulating sheet 840 to each of the workpieces 830. The patching device 500 includes a feeding robot which attaches the insulating sheet 840 onto the workpiece 830 through a pair of rollers 510, and the insulating sheet 840 is, for example, a polyester film (Mylar) or the like. The transporting device 600 is used to load one of the workpieces 830 having the insulating sheet 840 into a tray 850. Thus, until a plurality of workpieces 830 are filled within the tray 850, the transporting device 600 moves the tray 850 into a box 870. After a plurality of the trays 850 are filled with the box 870, the transporting device 600 then moves the box 870 to a distribution area.

In this embodiment, the transporting device 600 includes a tray turnover device 610 and a robotic arm 620. The tray turnover device 610 is pivotally installed on site through a pivot P1, and a suction cup 612 of one of the long arms 611 of the tray turnover device 610 can grasp and move one of the workpieces 830. The robotic arm 620 is pivotally arranged on the site through another pivot P2. A grabbing member 621 of the robotic arm 620 can move an empty tray 860 from an empty area A2 to a tray collection area A3, and move the tray 860 filled up with the workpieces 830 to the box 870 of a box collection area A4 from the tray collection area A3.

In this way, after the workpiece 830 attached with the insulating sheet (hereinafter referred to as a completed workpiece 830) is checked in an inspection area C without errors, the completed workpiece 830 will be sent to a qualified-product collection area A1. Then, the suction cup 612 of the tray turnover device 610 lifts the completed workpiece 830 and rotates about the pivot P1, so that the completed workpiece 830 moves from the qualified-product collection area A1 to one of the trays 850 placed within the tray collection area A3. Until the tray 850 is filled with a specific number of finished workpieces 830, the robotic arm 620 rotates about the pivot P2, so that the grabbing member 621 of the robotic arm 620 removes the tray 850 full of the workpieces 830 into the box 870 placed in the box collection area A4 from the tray collection area A3. At the same time, another grabbing member 621 of the robotic arm 620 moves an empty tray 860 from the empty area A2 to the tray collection area A3.

In addition, the automatic production equipment 10 further includes a control unit 700. The control unit 700 is connected to the vibrating machine module 330 of the rivet providing mechanism 300, the power unit of the strip-material feeding device set 100, the continual stamping die set 200, and the tray turnover device 610 and the robotic arm 620 of the transporting device 600. The control unit 700 is able to control the vibrating machine module 330 of the rivet providing mechanism 300, the power unit of the strip-material feeding device set 100, the continual stamping die set 200, and the tray turnover device 610 and the robotic arm 620 of the transporting device 600 to cooperatively operate at the appropriate timing. The control unit 700 is, for example, a programmable logic controller (PLC) controller.

Thus, based on the embodiments above, the present disclosure can not only reduce the cost of production line configuration, but also can improve the efficiency of the working process and the production efficiency.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An automatic production equipment for sheet metal stamping and in-mold riveting thereon, comprising:
    a strip-material feeding device set for continually moving a sheet-metal strip material along a material-feeding direction, wherein the sheet-metal strip material is forwardly moved one distance unit per time interval to one of predetermined locations;
    a continual stamping die set, comprising:
        a lower stamping die group comprising a lower die plate, a strip receiving groove, a sliding block and a guide groove, the strip receiving groove formed on the lower die plate for receiving the sheet-metal strip material, the sliding block slidably located on the strip receiving groove, and the guide groove formed on one lateral side of the sliding block to connect to the strip receiving groove in a stamping stroke direction; and
        a upper stamping die group comprising an upper clamping plate, a pushing lever and a riveting punch, the pushing lever and the riveting punch respectively located on the upper clamping plate to extend towards the stamping stroke direction, wherein the material-feeding direction is orthogonal to the stamping stroke direction; and
    a rivet providing mechanism connected to the sliding block, and is used to feed rivets into the guide groove one by one,
    wherein when the upper stamping die group moves to the lower stamping die group along the stamping stroke direction, the strip-material feeding device set stops pushing the sheet-metal strip material, and the upper stamping die group pushes the sliding block in the material-feeding direction, so that one of the rivets in the guide groove coaxially aligns with the pushing lever, the pushing lever pushes the one of the rivets from the guide groove to the sheet-metal strip material for allowing the riveting punch to subsequently punch the one of the rivets onto the sheet-metal strip material.

2. The automatic production equipment for sheet metal stamping and in-mold riveting thereon of claim 1, wherein the rivet providing mechanism comprises:
    a hopper for storing the rivets therein;
    a rivet conveying rail connected to the hopper and the sliding block respectively; and
    a vibrating machine connected to the hopper and the rivet conveying rail for outputting vibration energy that is capable of sending the rivets to the guide groove one by one through the rivet conveying rail.

3. The automatic production equipment for sheet metal stamping and in-mold riveting thereon of claim 2, wherein the vibrating machine comprises:
    a circular type vibration module physically contacted with a bottom portion of the hopper for outputting a vertical vibration energy to the hopper; and
    a linear type vibration module physically contacted with the rivet conveying rail for outputting a horizontal vibration energy to the rivet conveying rail.

4. The automatic production equipment for sheet metal stamping and in-mold riveting thereon of claim 1, wherein the strip-material feeding device set comprises:
    a strip-material roll holder bundled around by one part of the sheet-metal strip material; and two strip-feeding rollers located between the strip-material roll holder and the continual stamping die set to clamp the sheet-metal strip material therebetween, wherein the strip-feeding rollers are rotated reversely with each other to continually forwardly push the sheet-metal strip material, and the strip-feeding rollers equidistantly moves the sheet-metal strip material the distance unit forwardly per time interval.

5. The automatic production equipment for sheet metal stamping and in-mold riveting thereon of claim 1, wherein the lower stamping die group comprises:

a stop block;

a block-side baffle located on the lower die plate, and between the stop block and the sliding block, wherein a gap is formed between the block-side baffle and the sliding block, and the sliding block is provided with a guide slope facing towards the gap;

an elastic element abutting against the stop block and the block-side baffle; and a horizontal axis column penetrating through the block-side baffle, and two opposite ends of the horizontal axis column fixedly connected to the sliding block and the stop block; and the upper stamping die group further comprises a pushing block disposed on the upper clamping plate, wherein the pushing lever disposed between the pushing block and the riveting punch, wherein when the pushing block extends into the gap, the pushing block pushes the sliding block along the guide slope to slide in the material-feeding direction of the sheet-metal strip material, so that the elastic element is compressed by the stop block and the block-side baffle, and the lateral side of the sliding block abuts against one of the rivets on the rivet providing mechanism.

6. The automatic production equipment for sheet metal stamping and in-mold riveting thereon of claim 1, wherein the upper stamping die group further comprises:

a pressing plate fixedly connected to the upper clamping plate;

a crank shaft;

a crank element pivotally connected to the pressing plate through the crank shaft, wherein one part of the crank element abuts against the pushing lever, and a long axis direction of the crank element intersects the stamping stroke direction;

a crank guide block movably located on the upper clamping plate, and abutting another part of the crank element; and a spring element connected to the crank guide block and the pressing plate, wherein, when the upper stamping die group moves the pressing plate downwardly, so that the pressing plate pushes the crank guide block through the spring element, the crank guide block and the pressing plate compress the spring element to store a restoring resilience force, when the guide groove is coaxially aligned with the pushing lever, the restoring resilience force of the spring element rises the crank guide block to rise, so that the crank guide block rotates the crank element by a swing angle, and presses down the pushing lever by the one part of the crank element such that the one of the rivets is sent onto the sheet-metal strip material.

7. The automatic production equipment for sheet metal stamping and in-mold riveting thereon of claim 1, wherein the upper stamping die group further comprises:

a plurality of cutting dies located on the lower die plate, and arranged in order in the material-feeding direction for respectively punching on different positions of the sheet-metal strip material to complete a plurality of workpieces in sequence.

8. The automatic production equipment for sheet metal stamping and in-mold riveting thereon of claim 7, wherein each of the workpieces is designed to be sequentially formed on the sheet-metal strip material by a variety of stamping processes, and the cutting dies are allowed to simultaneously perform the stamping processes on the sheet-metal strip material.

9. The automatic production equipment for sheet metal stamping and in-mold riveting thereon of claim 7, further comprising:

a patching device connected to the continual stamping die set for attaching an insulating sheet to each of the workpieces.

10. The automatic production equipment for sheet metal stamping and in-mold riveting thereon of claim 9, further comprising:

a transporting device for loading one of the workpieces having the insulating sheet into a box.

* * * * *